Jan. 27, 1931.   N. T. SHORTS   1,790,078
AIRSHIP
Filed July 2, 1929   3 Sheets-Sheet 1

Inventor:
Nelson T. Shorts
By Monroe E. Miller
Attorney.

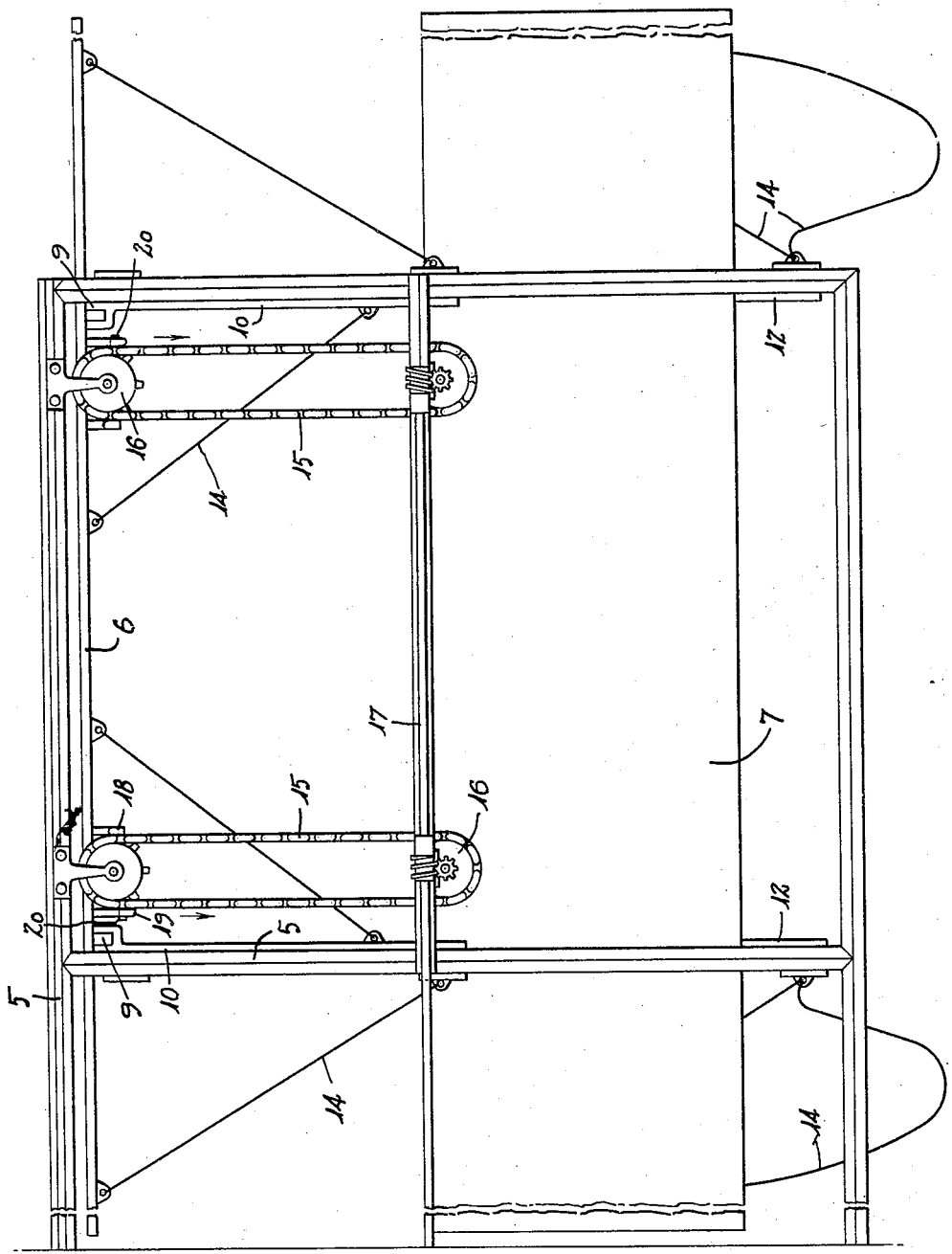

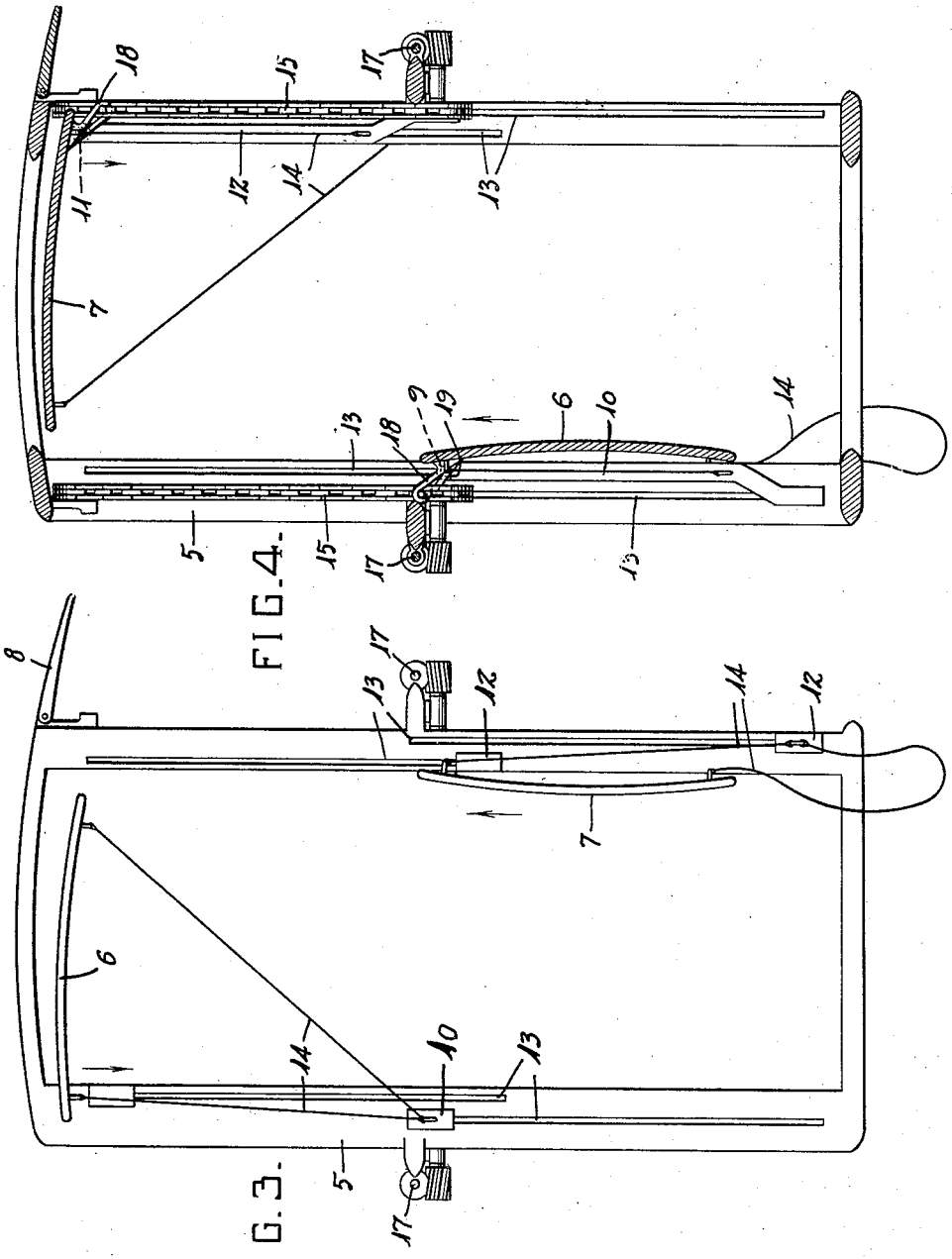

Patented Jan. 27, 1931

1,790,078

UNITED STATES PATENT OFFICE

NELSON T. SHORTS, OF FERN, PENNSYLVANIA

AIRSHIP

Application filed July 2, 1929. Serial No. 375,388.

The present invention relates to airships, and aims to provide an airship which may ascend and descend within small space and which after taking off may have flight as an airplane.

Another object of the invention is the provision of wings mounted for upward and downward movement, and novel means for moving said wings upwardly and downwardly and folding and opening said wings during their upward and downward movements, respectively, to obtain a lifting force for vertical ascent or descent.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 2 is a front view of the wing structure at one side.

Fig. 3 is an end view of said wing structure.

Fig. 4 is a cross section thereof showing the wings in another position.

Figure 1:
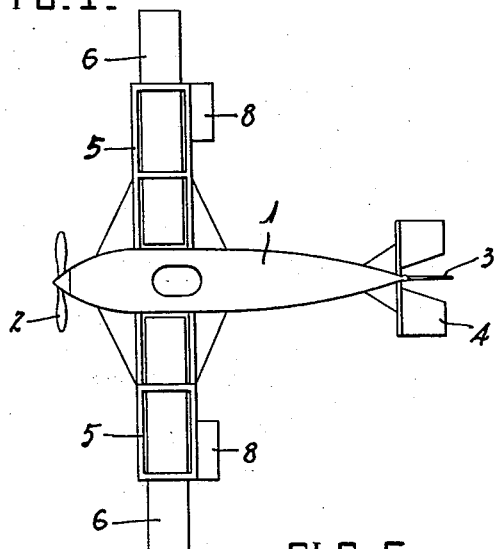
Figure 1 is a diagrammatical plan view of an airplane embodying the improvements.

The airship may be constructed similar to an airplane with the fuselage 1, propeller 2, steering rudder 3, and elevators 4.

In carrying out the invention skeleton frames or outriggers 5 project from the fuselage 1 and the wings 6 and 7 are disposed therein. The ailerons 8 may be hinged to the frames 5.

A pair of wings 6 and 7 is mounted in each frame or outrigger 5, the wing 6 being termed the "front" wing and the wing 7 being termed the "rear" wing, in that said wings are mounted at the front and rear, respectively, of the frame 5.

The front wing 6 is hingedly connected, as at 9, at the front edge thereof with slides 10, while the rear wing 7 is hingedly connected, as at 11, at its rear edge with slides 12. Said slides 10 and 12 are mounted for vertical movement in slots 13 in the struts of the frame 5, thereby mounting the wings for upward and downward reciprocation.

Wires or other flexible elements 14 connect the lower ends of the slides and the wings to limit the upward swinging movements of the wings and to assist in transmitting the strains between the wings and frame. Said elements 14 are flexible so as not to interfere with the downward swinging movements of the wings.

The operating means for the wings includes endless sprocket chains 15 passing around upper and lower sprocket wheels 16 which are suitably supported by the frame 5 at the front and rear thereof, and said sprocket wheels are geared to shafts 17 which are driven by the engine (not shown) with suitable clutch means for making and breaking the connection.

Referring to the front wing 6, it is provided with a pair of arms 18 and 19 for each corresponding sprocket chain 15, with said arms extending across the opposite runs of said chain, and the chain has an outstanding lug 20.

Figure 6:
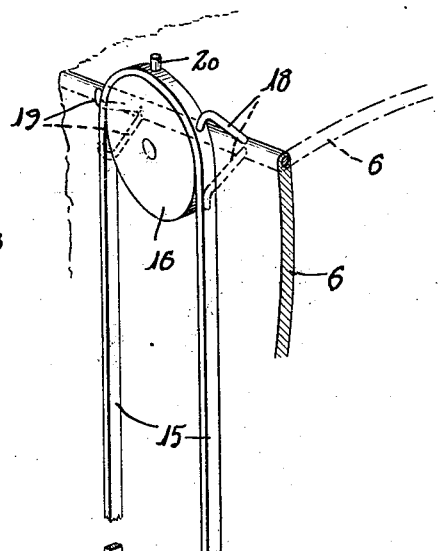
Figs. 6 and 7 are diagrammatical perspective views illustrating one of the wing operating devices.
Figure 5:
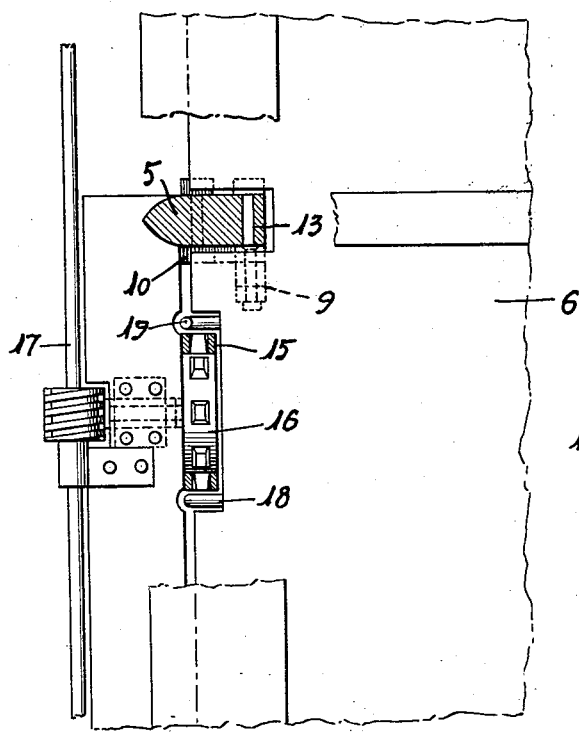
Fig. 5 is an enlarged detail view of one of the wing operating devices.
Figure 7:
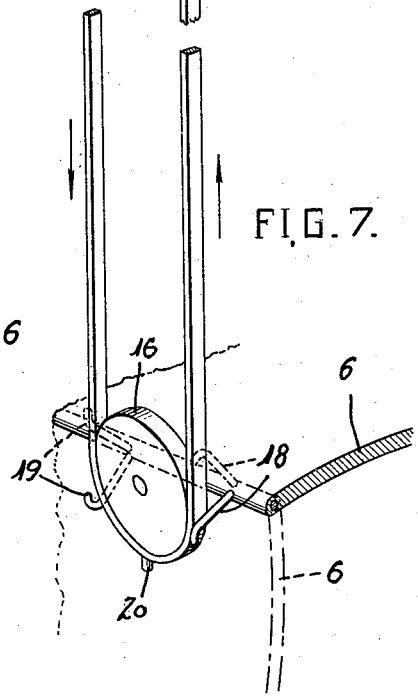

The arrangement is such, reference being had to Figs. 6 and 7, that the wing 6 is swung downwardly to vertical position or is folded when moved upwardly, and is swung to open or unfolded position when moved downwardly, thereby obtaining an upward lift.

Fig. 6 illustrates the wing 6 after being raised, the lug 20 having moved from under the arm 18 and approaching the arm 19. When the lug 20 contacts with the arm 19 it swings said arm downwardly, thereby swinging the wing 6 from folded to open position, as indicated in broken lines, and the arm 19 being moved downwardly with the lug 20 will move the wing downwardly.

When the lower limit of movement is reached, the lug 20 moves from off the arm 19, as seen in Fig. 7, and the lug 20 then engages the arm 18 and swings said arm upwardly, thereby moving the wing 6 from open to folded position, as seen in broken lines in Fig. 7. The arm 18 is moved upwardly with the lug 20, thereby raising the wing 6 in its folded position, and the cycle is repeated.

The arms 18 and 19 of the rear wing 7 are at the rear edge thereof, but the operation is substantially the same, so that the rear wing is moved upwardly while folded and is moved downwardly in open position.

The wings 6 and 7 are arranged to alternate so as to pass one another, one wing moving downwardly in open position and the other wing moving upwardly in folded position. Fig. 3 shows the wing 6 starting downwardly in open position and the wing 7 starting upwardly in folded position, while Fig. 4 shows the wing 7 starting downwardly in open position and the wing 6 starting upwardly in folded position.

The upward and downward movement of the wings may thus be employed for obtaining a lifting force, the downwardly moving open wings acting on the air underneath to obtain the lifting force, and by regulating the speed the airship may be made to ascend or descend or to remain at substantially the same altitude.

When the airship has ascended it may be flown as an airplane. This is accomplished by stopping the operating means for the wings when the rear wings 7 have been moved upwardly and started downwardly, as seen in Fig. 4. The forward motion of the airship will result in the front wings 16 being swung rearwardly and upwardly. This would necessitate releasing the front shafts 17 so that the chains 15 can run backwardly sufficiently to permit the arms 18 to swing downwardly, and provision for that purpose may be readily made by using a suitable clutch device.

The wings 6 and 7, when open, have a suitable angle of incidence, and may also have a suitable camber, so that said wings will sustain the airship in flight.

Having thus described the invention, what is claimed as new is:

1. In an airship, a wing, means mounting same for upward and downward sliding and swinging movements, and operating means for moving said wing upwardly and downwardly and folding and opening the wing in its upward and downward movements.

2. In an airship, a wing, means mounting the wing for upward and downward and swinging movements, operating means including an endless sprocket chain having an outstanding lug, and arms secured to said wing to be engaged by said lug in its upward and downward movements for moving the wing upwardly and downwardly in folded and open positions.

3. In an airship, a wing, means for mounting said wing for upward and downward and swinging movements, operating means including sprocket wheels mounted at the upper and lower limits of movement of the wing and an endless sprocket chain passing around said wheels and having an outstanding lug, and arms secured to said wing and extending across the opposite runs of said chain, one arm being arranged to be engaged by said lug in its upward movement to swing the wing downwardly and then raise the wing, and the other arm being arranged to be engaged by said lug in the downward movement of the lug to swing the wing upwardly to open position and to then move said wing downwardly.

4. In an airship, front and rear wings, means for mounting said wings for upward and downward sliding and swinging movements, and operating means for alternately moving said wings to move one wing downwardly in open position and the other wing upwardly in folded position.

5. In an airship, front and rear wings, means mounting said wings for upward and downward movement to pass one another with the front and rear wings hingedly mounted at their front and rear edges, respectively, and operating means for alternately moving said wings and for moving one wing downwardly in open position and the other wing upwardly in folded position.

6. In an airship, a frame, vertically movable slides mounted in the frame, a wing hingedly connected with said slides to swing downwardly and upwardly to folded and open positions, respectively, flexible elements connecting said wing and slides to limit the upward movement of the wing, and operating means for moving the wing upwardly in folded position and downwardly in open position.

In testimony whereof I hereunto affix my signature.

NELSON T. SHORTS.